Patented Feb. 20, 1934

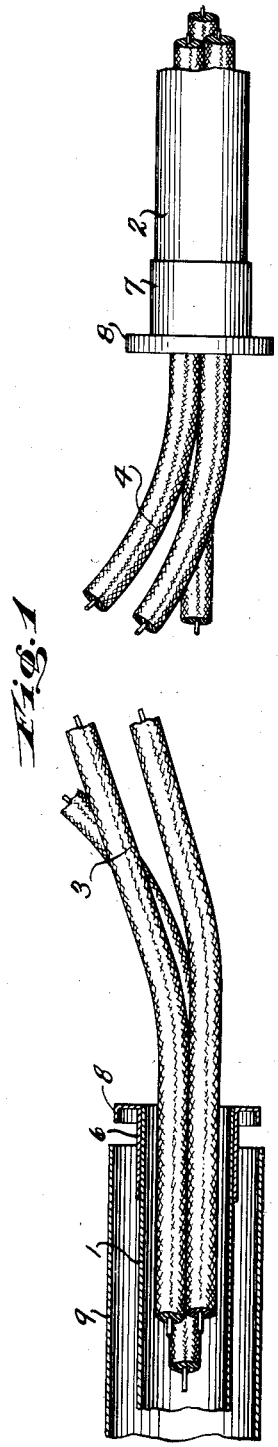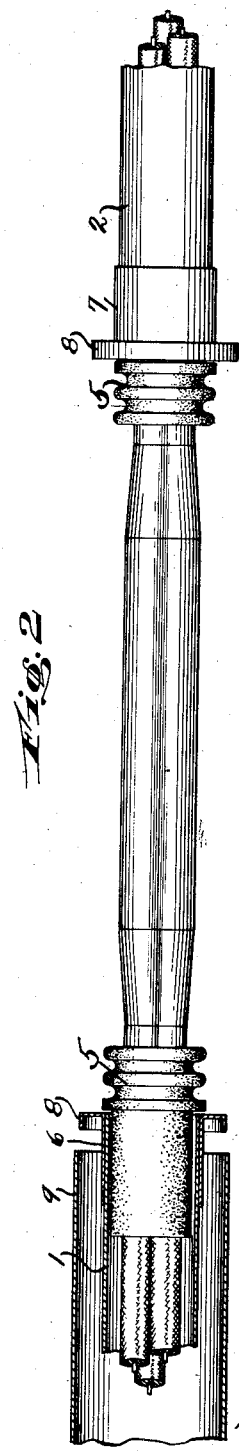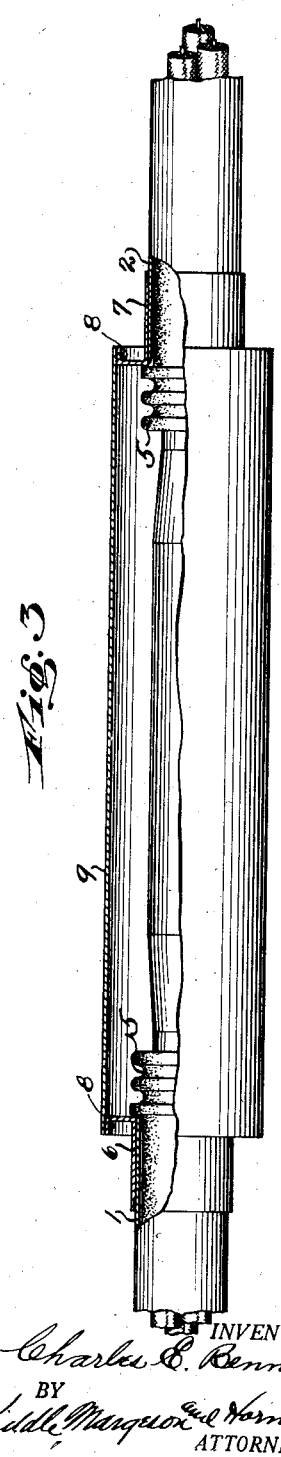

1,947,454

UNITED STATES PATENT OFFICE 1,947,454

CABLE JOINT

Charles E. Bennett, Hawthorne, N. J., assignor to The Okonite-Callender Cable Company, Incorporated, Paterson, N. J., a corporation of New Jersey Application March 1, 1932. Serial No. 595,991

2 Claims. (Cl. 173—268)

This invention is directed to jointing electric cables and has particular application in the jointing of cables on installation in metal pipes such as disclosed in my copending application Serial No. 553,714, filed July 29, 1931.

One of the objects of my invention is the provision of a joint of simple construction and of such a character as to be practically integral with the pipe in which the cable is installed. The assembly is made above ground and the joint is thrown into the ditch with the running pipe lengths during installation of the cable.

In the accompanying drawing:

Fig. 1 is a view partly in section of the first step in the operation of the making of the joint;

Fig. 2 is a similar view showing the next step in the making of the joint; and

Fig. 3 is a similar view showing the completed joint.

Referring to the drawing in detail, 1 and 2 designate the ends of the two metal pipes in which the cable is to be laid, 3 and 4 designating the cable ends to be joined.

Before the cable has been inserted in the pipes 1 and 2 and before the cable ends 3 and 4 have been joined a metal sleeve 6 is slipped over the outer end of the pipe 1 and a similar sleeve 7 over the end of the pipe 2, these sleeves being welded to their respective pipes. The cable is then pulled into the pipes, and bushings 5 slipped over the cable ends. The bushings 5 may be porcelain, pyrex or other poor heat conductor, and protect the insulation of the cable against the welding heat. The sleeves 6 and 7 are each provided with an annular flange 8.

Before the cables 3 and 4 are joined a steel tube or casing 9 is slipped over the sleeve 6 or 7, this tube fitting the flanges 8.

The cable ends 3 and 4 may now be joined in the usual way and then the tube 9 is moved forward until its ends overlap the flanges 8 of the sleeves 6 and 7, as shown in Fig. 3, and welded thereto.

This completes the joint and as the joint and pipes are substantially integral with each other, it will be apparent the whole assembly may be thrown into the ditch as a unit.

It will be seen from the foregoing that the joint is of such construction that it may be made above ground; that the insulators 5 effectively protect the insulation of the cable from damage during the welding operations, and that, as above noted, the joint in effect is made integral with the pipes 1 and 2.

What I claim is:—

1. A joint for electric cables comprising in combination pipes for receiving the cables to be joined and having their adjacent ends spaced apart, a heat insulator within the adjacent ends of each of said pipes, a sleeve welded to the adjacent spaced ends of said pipes, and a metal casing surrounding the cables, insulators and said sleeves, said casing being welded to said sleeves, and said insulators surrounding the insulation of the cables, and disposed intermediate the cable insulation and said pipes, sleeves and casing so as to overlie the cable insulation at the welds.

2. A joint for electric cables comprising in combination pipes for receiving the cables to be joined and having their adjacent ends spaced apart, a heat insulator within the adjacent ends of each of said pipes, a sleeve welded to the adjacent spaced ends of said pipes, each of said sleeves being provided with an outwardly extending annular flange, and a metal casing surrounding the cables, insulators and said sleeves, said casing being welded to said flanges, and said insulators surrounding the insulation of the cables and disposed intermediate the cable insulation and said pipes, sleeves and casing so as to overlie the cable insulation at the welds.

CHARLES E. BENNETT.